(12) United States Patent
Braun

(10) Patent No.: US 7,988,531 B2
(45) Date of Patent: Aug. 2, 2011

(54) GRINDING MACHINE

(75) Inventor: Hans-Dieter Braun, Frittlingen (DE)

(73) Assignee: HAAS SCHLEIFMASCHINEN GmbH, Trossingen (DE)

( * ) Notice: Subject to any disclaimer, the term of this patent is extended or adjusted under 35 U.S.C. 154(b) by 331 days.

(21) Appl. No.: 12/292,083

(22) Filed: Nov. 12, 2008

(65) Prior Publication Data

US 2009/0124171 A1 May 14, 2009

(30) Foreign Application Priority Data

Nov. 13, 2007 (DE) .................. 10 2007 054 433

(51) Int. Cl.
*B24B 49/00* (2006.01)

(52) U.S. Cl. ............ 451/10; 451/11; 451/215; 451/221; 451/247; 451/333; 451/335

(58) Field of Classification Search ................ 451/9, 10, 451/11, 48, 212, 213, 214, 215, 221, 246, 451/247, 264, 265, 268, 292, 332, 333, 335, 451/375, 376, 380, 387, 397
See application file for complete search history.

(56) References Cited

U.S. PATENT DOCUMENTS

| | | | | |
|---|---|---|---|---|
| 4,087,901 A | * | 5/1978 | Lohneis et al. .................. 483/8 |
| 4,608,747 A | * | 9/1986 | Link et al. ...................... 483/14 |
| 4,680,896 A | * | 7/1987 | Breitenstein et al. ......... 451/334 |
| 4,809,422 A | * | 3/1989 | Kitamura ....................... 483/14 |
| 4,996,762 A | * | 3/1991 | Takayama ....................... 483/49 |
| 5,480,343 A | * | 1/1996 | Pedersen et al. ................ 451/10 |
| 5,738,564 A | * | 4/1998 | Helle et al. .................... 451/11 |
| 6,224,462 B1 | * | 5/2001 | Yokoyama et al. .............. 451/10 |
| 6,244,928 B1 | * | 6/2001 | Hiramoto .......................... 451/5 |

(Continued)

FOREIGN PATENT DOCUMENTS

| | | |
|---|---|---|
| DE | 43 26 595 C2 | 2/1995 |
| DE | 101 11 098 A1 | 9/2002 |
| DE | 101 44 678 A1 | 4/2003 |
| DE | 102 24 347 A1 | 12/2003 |
| DE | 10 2005 039 818 A1 | 3/2007 |
| EP | 1291122 A2 | 3/2003 |

OTHER PUBLICATIONS

European Patent Application No. 08 013 928.0 with an extended Search Report, issued on Aug. 6, 2010.

*Primary Examiner* — Eileen P. Morgan

(74) *Attorney, Agent, or Firm* — The Nath Law Group; Jerald L. Meyer; Robert T. Burns

(57) ABSTRACT

Grinding machine with a machine bed, with a tool carriage that is linearly movable on the machine bed in a Y-axis, with a tool spindle, which is mounted in the tool carriage so as to rotate around an X-axis that is perpendicular to the Y-axis, and which can be rotationally driven, with an X-carriage that is linearly movable on the machine bed in the X-axis, with a Z-carriage that is linearly movable on the X-carriage with a Z-axis that is perpendicular to the X-axis and the Y-axis, and with a work piece jig, which is arranged on the Z-carriage so as to pivot around a B-axis, which is parallel to the Y-axis, and which is capable of rotating around its A-axis, which is perpendicular to the B-axis.

16 Claims, 8 Drawing Sheets

U.S. PATENT DOCUMENTS

Figure 1:
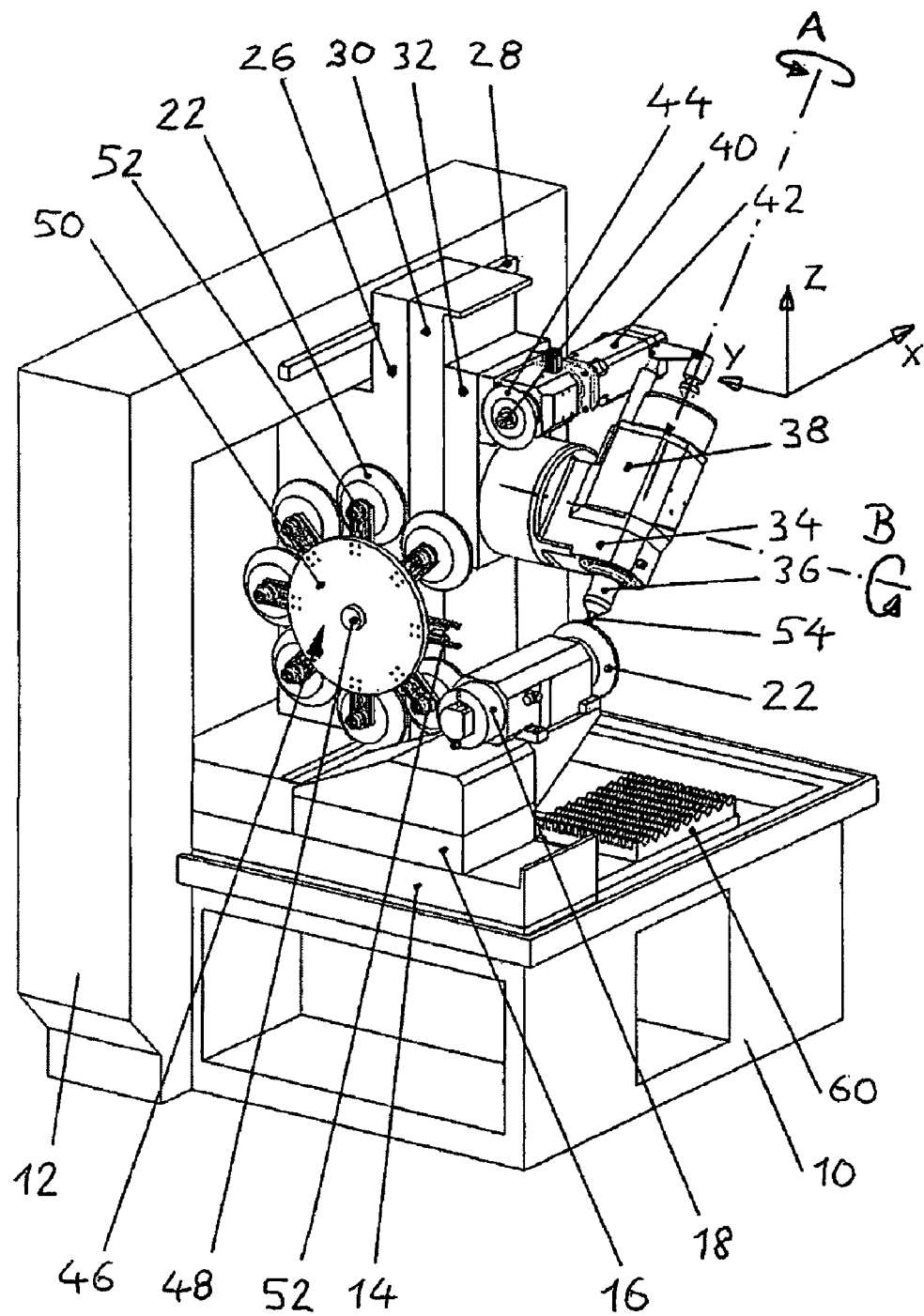

| | | | |
|---|---|---|---|
| 6,454,636 B1 * | 9/2002 | Iwabuchi | 451/53 |
| 6,585,564 B1 * | 7/2003 | Hiramoto et al. | 451/7 |
| 7,043,805 B2 * | 5/2006 | Tokuma et al. | 29/27 C |
| 7,207,865 B2 * | 4/2007 | Bailer et al. | 451/9 |
| 7,335,091 B2 * | 2/2008 | Burgess | 451/273 |
| 2008/0220697 A1 * | 9/2008 | Hyatt et al. | 451/21 |

* cited by examiner

GRINDING MACHINE

The invention concerns a grinding machine.

With automatically controlled grinding machines, it is necessary to position the work piece to be processed and the grinding tool to be used for processing opposite one another in the three spatial axes X, Y and Z. Additionally, rotational axes are required for orienting the surfaces of the work piece to be processed and the tool in relation to one another in terms of angle of rotation and axial angle of inclination. In machining centers, it is known (DE 102 49 473 A1, EP 1 747 845 A1) to also use the linear main axes to load work pieces from a transport system, using the so-called pick-up principle, or to change tools from a magazine. In this, the programmable axes for processing and for work piece or tool changing are divided between the work piece jig and the tool spindle.

The object of the invention is to provide a grinding machine, which enables a reliable and multifaceted operation, with a compact, space-saving construction and a simple control.

According to the invention, the tool spindle can be moved only along the linear Y-axis, while the axis of the tool spindle remains aligned in the X-axis. The linear main axes X and Z and the rotational axes A and B are located in the work piece jig. With this, the movement of the tool spindle in the Y-axis can be used in a simple manner to move the tool spindle to a tool magazine for a tool change, and/or also to a centering spindle, in order to center a grinding disk that has been clamped to the tool spindle. The grinding work, the centering and the tool magazine can be arranged in a very compact and space-saving manner, wherein, nevertheless, a spatial boundary creates these areas, so that these areas do not overlap one another, and the highest degree of collision safety is ensured. Furthermore, the movement of the work piece jig can be used to exchange work pieces from a work piece magazine on the basis of the pick-up principle. In this, the movement of the work piece jig in two linear axes and two rotational axes results in a high level of flexibility in the configuration of the work piece magazines and in the positioning of the work pieces in the magazine.

The tool spindle is mounted, with its axis that is aligned in the X-direction, in a Y-tool carriage, which can be moved in the Y-axis on the machine bed. An X-carriage that can be moved linearly in the X-axis on the machine bed supports a Z-carriage, which can be moved linearly in the Z-axis, and which supports the work piece jig. The work piece jig is mounted on a dividing attachment so as to rotate around its axis as an A axis, wherein said apparatus is arranged on the Z-carriage so as to rotate around a round axis as a B-axis, so that the A-axis of the work piece jig can be pivoted in its spatial position.

The tool magazine is arranged on the X-carriage. In this case, the tool magazine has at least one tool holder, which is arranged such that, merely by moving the Y-carriage, the tool spindle can be aligned axially flush with the tool holder. By moving the tool magazine in the X-axis, the tool can then be removed from the tool spindle, or can be placed in it. Therefore, no additional controllable auxiliary axes are necessary for changing a tool. If the tool magazine has a plurality of tool holders, these can be brought to the X-carriage in the changing position by a simple movement of the tool magazine.

The work piece magazine can be arranged on the machine bed in such a way that the work piece jig can be placed directly in engagement with the work pieces arranged in the work piece magazine. To accomplish this, the work piece jig is pivoted via the B-axis in such a way that it is oriented in relation to the work piece magazine based upon the arrangement of the work pieces. By moving the work piece jig by means of the Z-carriage, and optionally the X-carriage, the work pieces can then be changed between the work piece jig and the work piece magazine.

To center the grinding disk that is clamped to the tool spindle, a centering spindle is mounted on the Z-carriage. For this, the axis of the centering spindle is aligned parallel to the axis of the tool spindle in the X-direction. The tool spindle, with the clamped grinding tool, is moved in the Y-axis into the Y-position of the centering spindle. In this centering position, the grinding tool is centered by moving the centering spindle in the X- and Z-axes. Therefore, no additional auxiliary axis is required for centering the grinding tools.

In what follows, the invention will be specified in greater detail within the context of an exemplary embodiment represented in the set of drawings. The drawings show FIG. 1 a view of the grinding machine from the left front, in the grinding position, FIG. 2 a view of the grinding machine from the right front, in the grinding position, FIG. 3 a view of the grinding machine from the left front, in the centering position, FIG. 4 a view of the grinding machine from the left front, in the tool changing position, FIGS. 5 and 6 a sectional view of the removal of a tool tip from a work piece magazine, FIG. 7 the removal of a drill bit from a work piece magazine and FIG. 8 the removal of a work carrier from a work piece magazine.

The grinding machine, shown in the set of drawings as an exemplary embodiment, has a horizontal machine bed 10, with a vertical, portal-type machine column 12 formed on its rear side, which faces away from the front, user side. A compartment, which encompasses the grinding machine, has been omitted from the drawings, in order to make the internal structure of the grinding machine visible.

A Y-guide 14 that extends in the Y-axis, on which a Y-carriage 16 can be moved via numerical control, is arranged on the left side of the machine bed 10, running from front to rear. The Y-carriage 16 supports a tool spindle 20, which can be driven by a motor 18, wherein the axis of said spindle is aligned within the horizontal X-axis, which is perpendicular to the Y-axis. On the tool spindle 20, tools, especially grinding tools 22, can be clamped, which are driven so as to rotate around the X-axis.

In the rear area, as seen from the user side, X-guides 24 are arranged on the upper side of the machine bed 10, running perpendicular to the Y-guide 14 and extending over the width of the machine bed. On the X-guide 24, an X-carriage 26, configured as a block standing on edge, can be moved via numerical control. To stabilize the X-carriage 26, it is guided at the top in an additional X-guide 28 at the upper cross-member of the machine column 12.

On the front, vertical surface of the X-carriage 26, which faces the user side, a Z-carriage 32 can be moved, via numerical control, in the vertical Z-axis, which is perpendicular to the X-axis and the Y-axis, in a Z-guide 30.

On the vertical end surface of the Z-carriage 32, which is turned to face the front user side, a dividing attachment 34 is arranged, which can be rotated around a B-axis as a round axis, which extends in the Y-direction. The dividing attachment 34 supports a work piece jig 36, which is capable of rotating around its axis, configured as A-axis, controlled by a drive 38. The A-axis intersects the B-axis at a right angle, so that the axis of the work piece jig 36 can be pivoted by means of the dividing attachment 34 in the X-Z plane.

Above the dividing attachment 34, a centering spindle 40 is mounted in the Z-carriage 32, and can be rotationally driven via a drive motor 42. The centering spindle 40, which extends in the X-direction, supports a centering disk 44 at it end that faces the Y-carriage.

A tool magazine 46 is arranged on the X-carriage 26, on its vertical side that faces the Y-guide 14. The tool magazine 46 has a magazine wheel 50, which is capable of rotating around a horizontal shaft 48 that is mounted in the X-direction, and on the outer periphery of which tool holders 52 are arranged in equal angular spacing. The tool holders 52 are configured such that tools, especially grinding tools 22, can be inserted into the tool holders 52 or removed from these, radially in relation to the magazine wheel 50. The shaft 48 is arranged in the X-carriage 26 at the same height at which the tool spindle 20 is located, with respect to the Z-direction.

A work piece 54 that is to be processed is clamped in the work piece jig 36. The grinding processing of the work piece 54 takes place in the manner represented in FIGS. 1 and 2, using a rotating grinding tool 22 that is clamped to the tool spindle 20. The relative movement of work piece 54 and grinding tool 22 in the Y-axis is effected via the Y-carriage 16, whereas the relative movement in the X-axis and the Z-axis via the X-carriage 26 and the Z-carriage 32 is effected via the work piece 54. The adjustment angle of the surfaces to be ground in relation to the axis of the work piece 54 is generated by pivoting the work piece jig 36 around the B-axis by means of the dividing attachment 34. The rotation of the work piece jig 36 around the A-axis enables the alignment of the surfaces to be processed on the periphery of the work piece 54.

Figure 2:
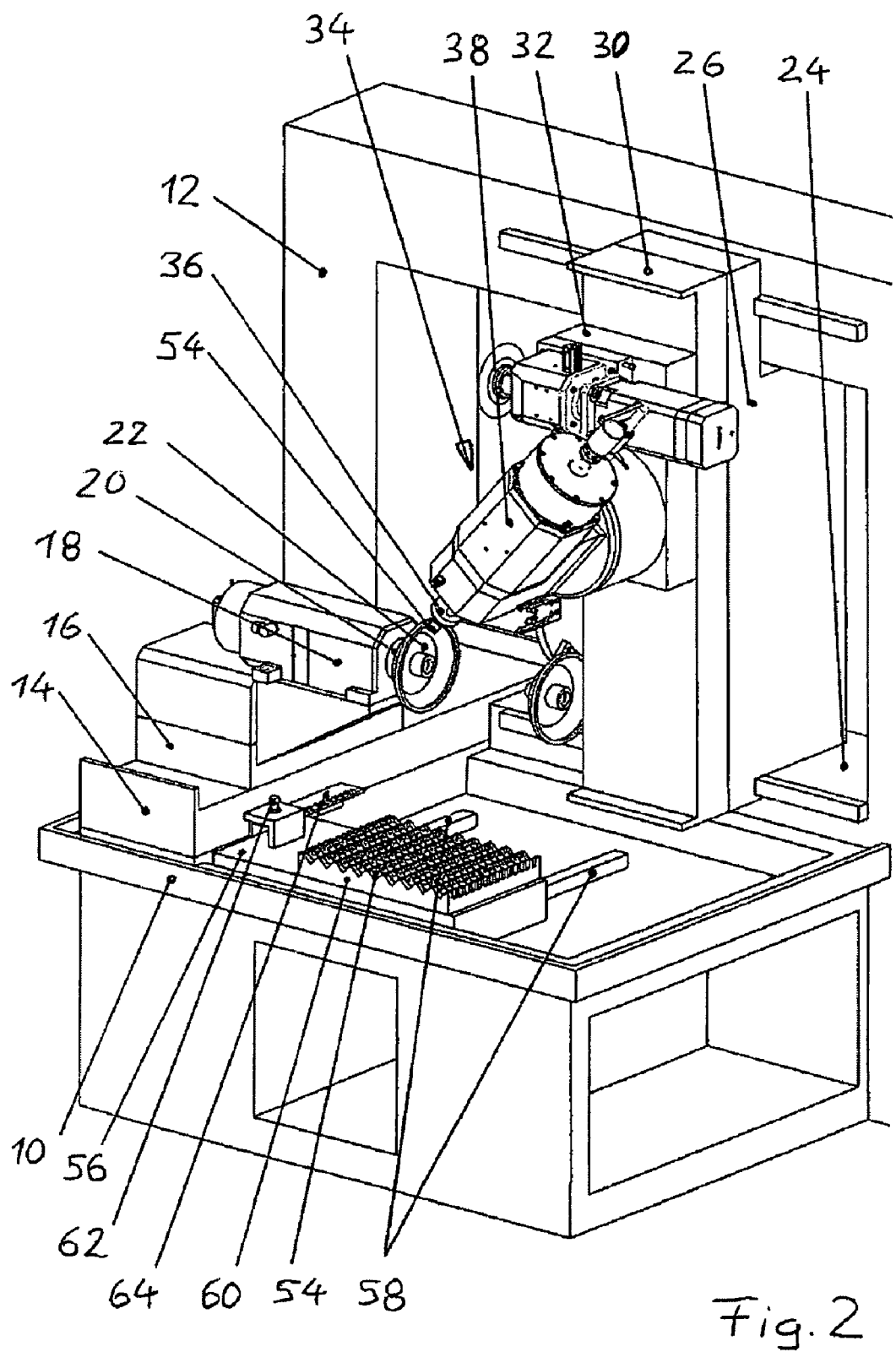
Figure 3:
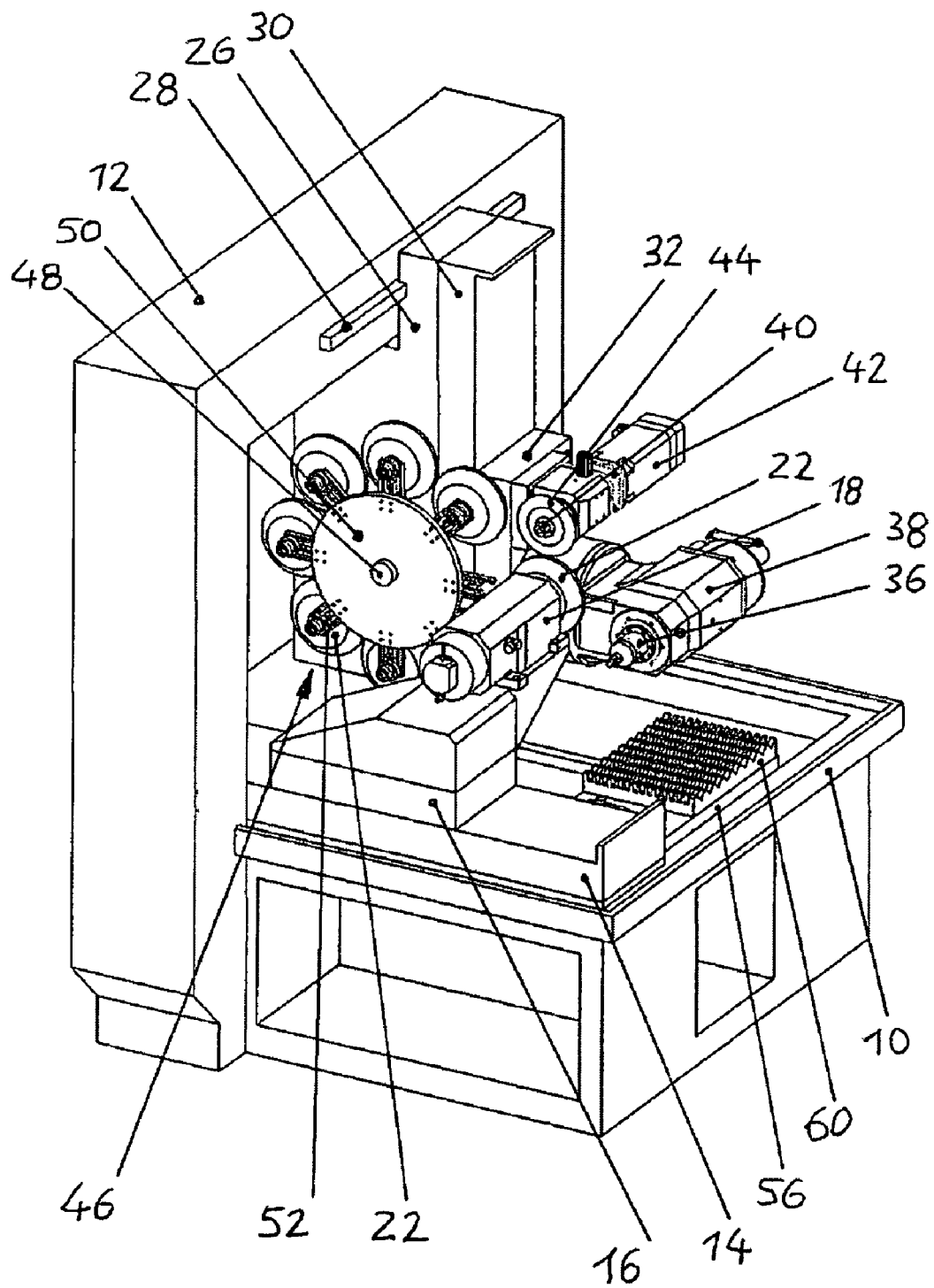

To center the grinding tool 22, the Y-carriage 16 is moved from the front, user side toward the rear in the Y-axis, until the tool spindle 20 is in the same vertical X-Z plane as the centering spindle 40. The centering spindle 40 can then be lowered via the Z-carriage 32, until the centering disk 44 comes into contact with the grinding tool 22, as is shown in FIG. 3. Because the tool spindle 20 and the centering spindle 40 are mounted axially parallel in the X-direction, the centering of the grinding tool 22 can be accomplished by moving the centering spindle 40 in a controlled fashion in the X-axis and in the Z-axis. Therefore, the controlled main axes, namely the X-axis and the Z-axis, are used for centering, without additional auxiliary axes being required. For centering, the grinding tool 22 is displaced toward the rear, in the Y-axis, in relation to the pivoting plane of the work piece jig 36, so that the centering process depicted in FIG. 3 is spatially separated from the grinding processing shown in FIGS. 1 and 2, and an overlapping and collision of these two processing steps is reliably excluded.

Figure 4:
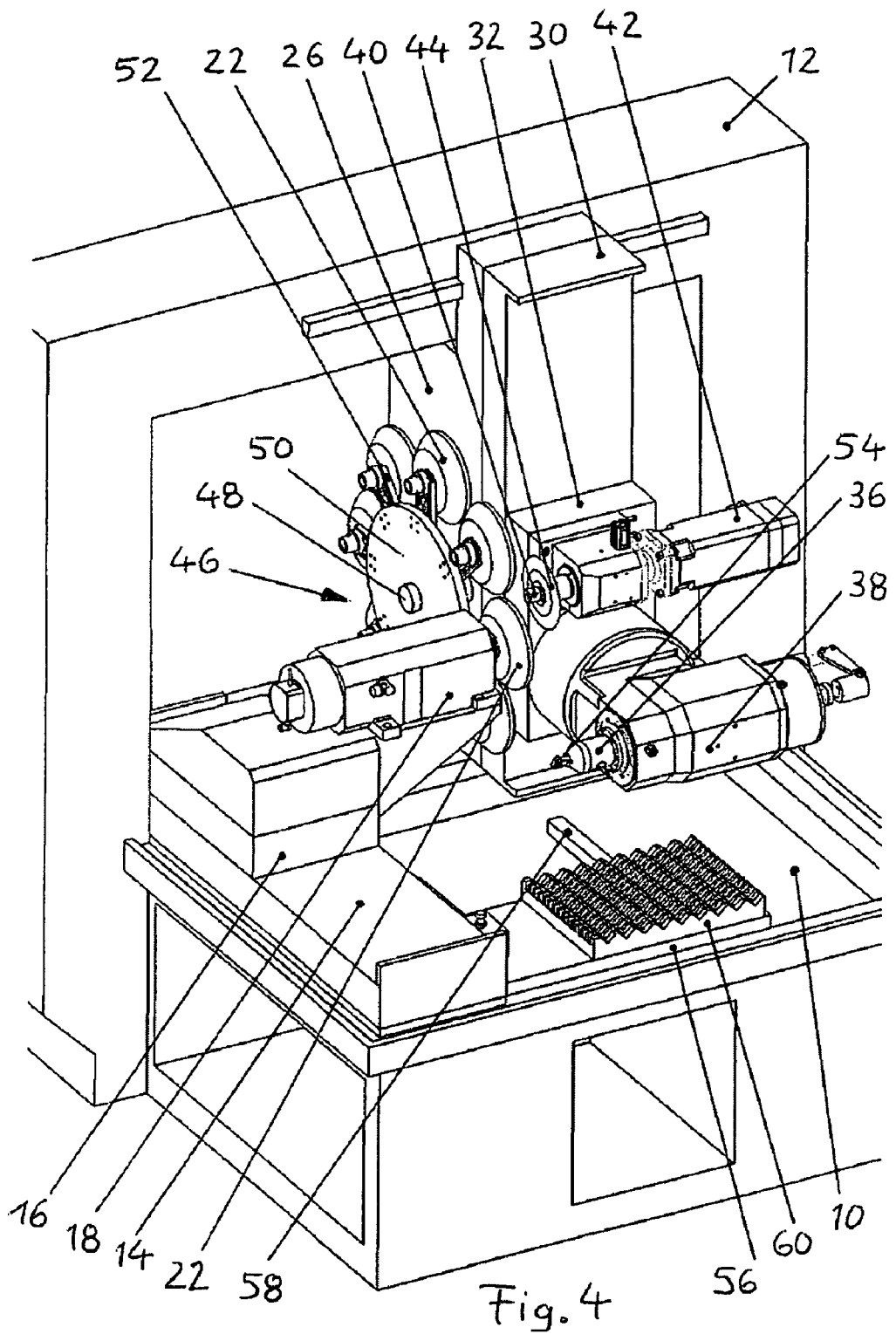

When the tool 22, which is clamped in the tool spindle 20, is to be exchanged for a different tool, the tool magazine 46 is rotated around the drivable shaft 48 such that an empty tool holder 52 is located in the changing position shown in FIG. 1, in which this empty tool holder 52 is positioned at the level of the shaft 48 and the tool spindle 20, and is aligned opposite the tool spindle 20. The Y-carriage 16 is then moved toward the rear in the Y-axis, as is shown in FIG. 4. The tool 22, which is clamped to the tool spindle 20, is then shifted radially into the empty tool holder 52 and is locked into this. The X-carriage is then moved toward the right in the X-axis, causing the tool 22, which has been locked into the tool holder 52, to be raised axially out of the clamping cone of the tool spindle 20. The magazine wheel 50 is then rotated, in order to bring a tool 22 that is stored in a different tool holder 52 to the changing position, in which the axis of this tool 22 is axially flush with the tool spindle 20. The X-carriage 26 is then moved in the X-axis toward the tool spindle 20, in order to axially position the tool 22 that is to be installed in the clamping cone of the tool spindle 20. Once the tool 22 has been clamped into the tool spindle 20, the Y-carriage is again moved toward the front in the Y-axis, causing the tool 22 that is clamped in the tool spindle 20 to be removed from the tool holder 52 in a radial direction. The Y-carriage 16 with the new tool 22 can then be moved into the operational position shown in FIGS. 1 and 2.

The tool change can also be accomplished merely by moving the tool spindle 20 in the Y-axis and moving the X-carriage 26 in the X-axis. Therefore, no additional controlled auxiliary axes are required for a tool change.

It is readily apparent that the tool magazine 46 need not necessarily be structured as a rotatable magazine wheel 50. Other configurations of the tool magazine 46 can also be used, in which tool holders can optionally be brought into a changing position, in which the tool holders are at the same level as the tool spindle 20, so that the tools 22 to be installed can be moved into these tool holders or removed from these tool holders by displacing the Y-carriage 16. For example, a tool magazine can have a plurality of tool holders, which are arranged one above another in the Z-axis, and can be displaced in the Z-axis.

It is also readily apparent that the grinding machine of the invention can also be used to implement not only grinding processes, but also other machining processes that employ rotating tools, such as milling processes. Also, in addition to grinding tools 22, milling tools can also be stored in the tool magazine 46 and installed as needed in the tool spindles 20.

The grinding machine of the invention also enables an automatic work piece change, using the linear axes X, Y, Z and rotational axes A and B that are necessary for the grinding processing.

To accomplish this, a work piece magazine is arranged on the machine bed 10 on the user side, in front of the X-carriage and to the right of the Y-guide.

In FIGS. 1 through 6, the work piece magazine has a support plate 56, which can be moved in guide tracks 58 on the machine bed 10 in the Y-axis. On the support plate 56, the work pieces 54 can be arranged in a matrix, which is configured, for example, as rows and columns in the X- and the Y-axis. In the represented exemplary embodiment, the work pieces 54 are blanking dies or stamping plates, which are held in the matrix arrangement in a cartridge 60, wherein the cartridge 60 is situated upon the support plate 56. To facilitate gripping of the work pieces 54, these are arranged at an angle in the cartridge 60, wherein the shaped side to be processed faces downward in the cartridge 60, as is especially illustrated in FIGS. 5 and 6.

Figure 5:
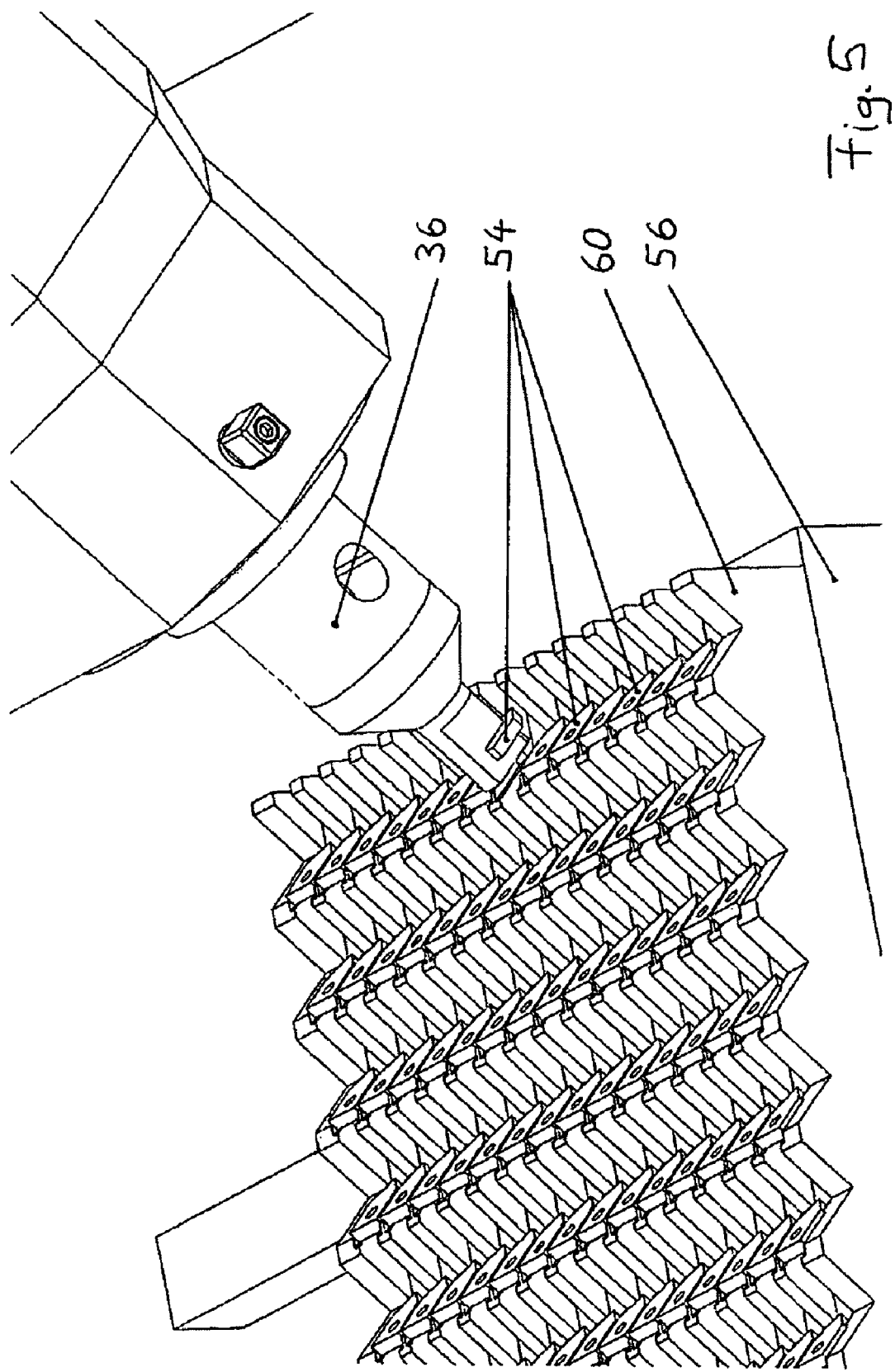
Figure 6:
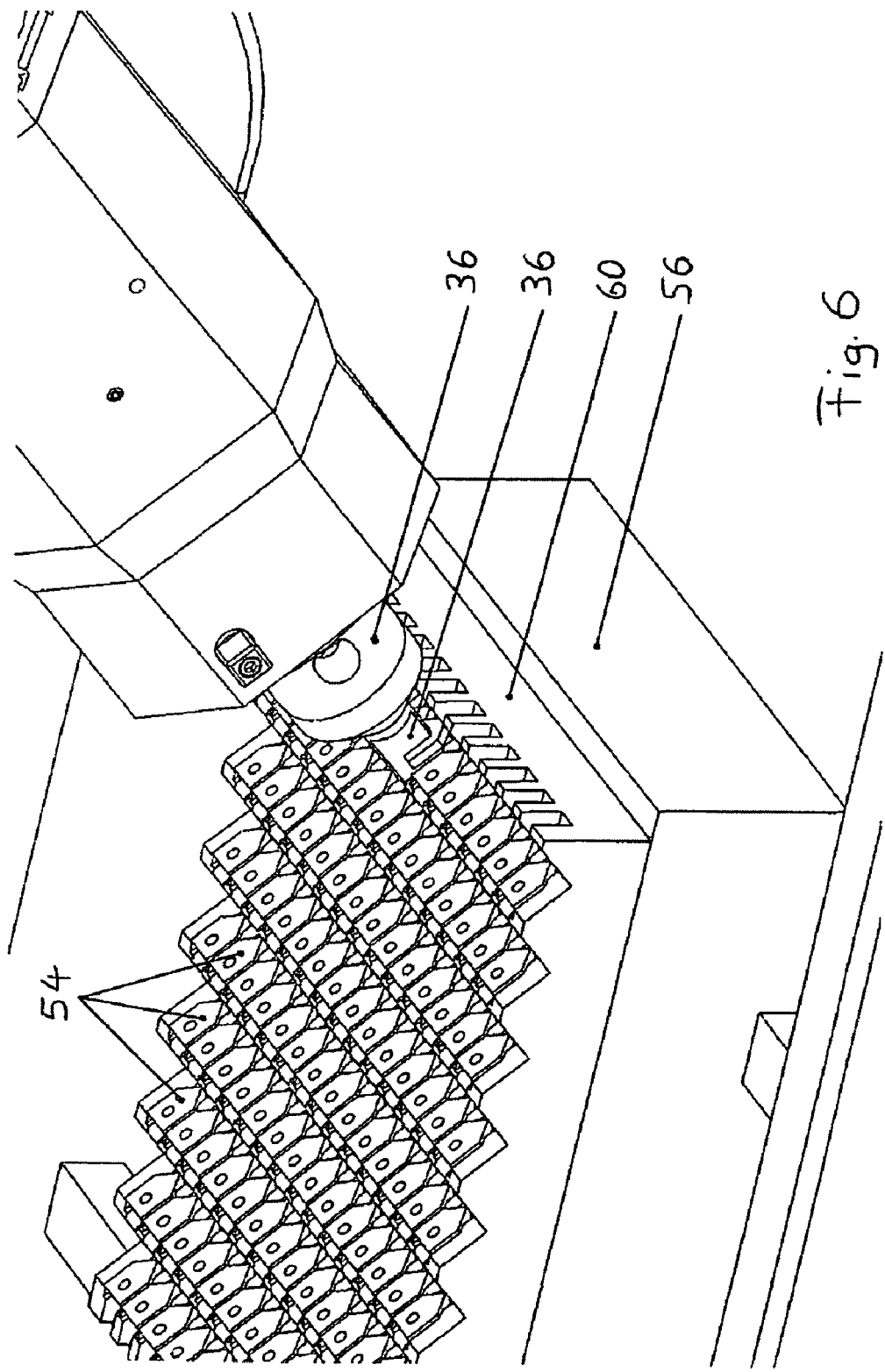

To remove a work piece 54, the work piece jig 36 is pivoted around the B-axis such that the axis of the work piece jig 36 is aligned perpendicular to the plane of the plates of the work pieces 54. The clamping jaws of the work piece jig 36 are oriented toward the work pieces 54 by rotating around the A-axis, as is shown in FIG. 5. By moving in the X-axis and the Z-axis, the work piece jig 36 can then be pushed onto the work piece 54 that is to be removed, as is shown in FIG. 6. The clamped work piece 54 can then be removed from the cartridge 60 and moved to the grinding tool 22 for processing. In the reverse sequence, the processed work piece 54 is placed back in the cartridge 60.

To be able to change the work pieces 54 from the matrix arrangement in the work piece magazine, the work piece jig 36 must be able to be positioned at any matrix position in the work piece magazine. Positioning in the X-axis is accomplished by moving the X-carriage 26. For positioning in the Y-axis, the support plate 56 is moved on the guide tracks 58. To this end, a spring-mounted pin 62 is arranged on the support plate 56, which pin cooperates with a perforated slat 64, which is arranged below the tool spindle 20 on the machine bed 10 and extends in the Y-direction. A release device, for example a pneumatic release device, which is arranged on the underside of the Y-carriage 16 below the tool spindle 20, draws the pin 62 against its spring force out of the respective hole in the perforated slat 64, causing the pin 62 to be freed from the perforated slat 64, and to be coupled with the Y-carriage 16. By moving the Y-carriage 16, the support plate 56 with its pin 62 can then be positioned over another hole in the perforated slat 64. When the pin 62 is released, it becomes latched again in the perforated slat 64 as a result of spring force, in order to reposition the support plate 56 and thereby the cartridge 60 in the Y-axis. In this, the distance between perforations in the perforated slat 64 corresponds to the spacing between the work pieces 54 in the Y-axis of the cartridge 60.

Figure 7:
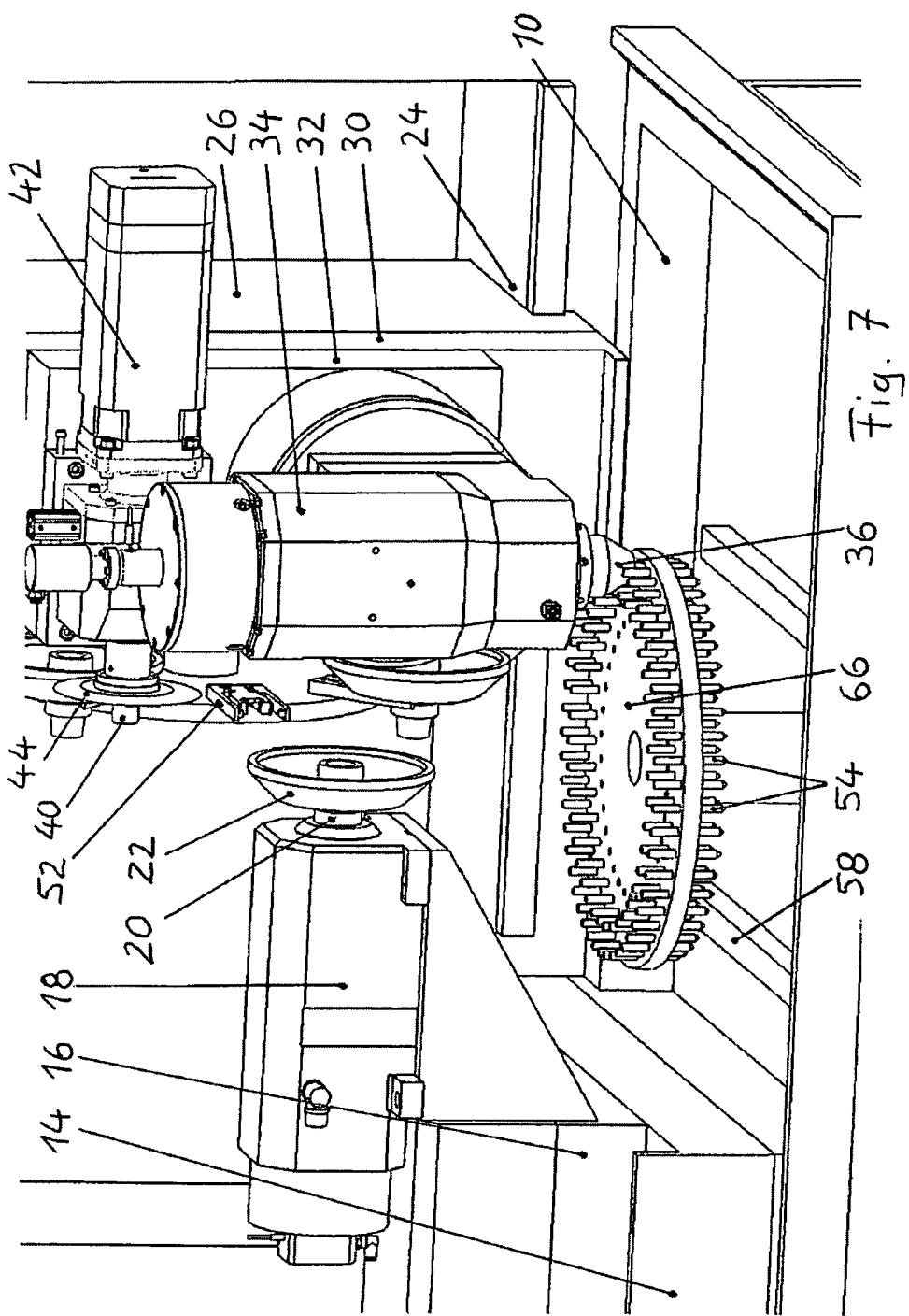

FIG. 7 shows a different example of the work piece magazine. In this case, the work piece magazine has a magazine wheel 66, which can be used as an alternative to, or optionally even interchangeably with, the support plate 56. The magazine wheel 66 is mounted on the machine bed 10 so as to rotate around a vertical axis (Z-axis). The magazine wheel 66 supports the work pieces 54, which in the example of FIG. 7 are represented as drill bits, arranged in the circumferential direction. The work pieces 54 can be held in a plurality of concentric circles in the magazine wheel 66.

For changing work pieces, the work piece jig 36 is aligned in the vertical Z-axis by the dividing attachment 34. By being lowered in the Z-axis, the work piece jig 36 can remove a work piece 54 from the magazine wheel 66, or can place a work piece in this magazine wheel 66. To select the magazine position, the magazine wheel 66 is rotated such that the work piece 54 to be changed is located in the Y-position of the work piece jig 36. In addition, the selection of the concentric rows of work pieces 54 occurs by moving the work piece jig 36 in the X-axis by means of the X-carriage 26.

Figure 8:
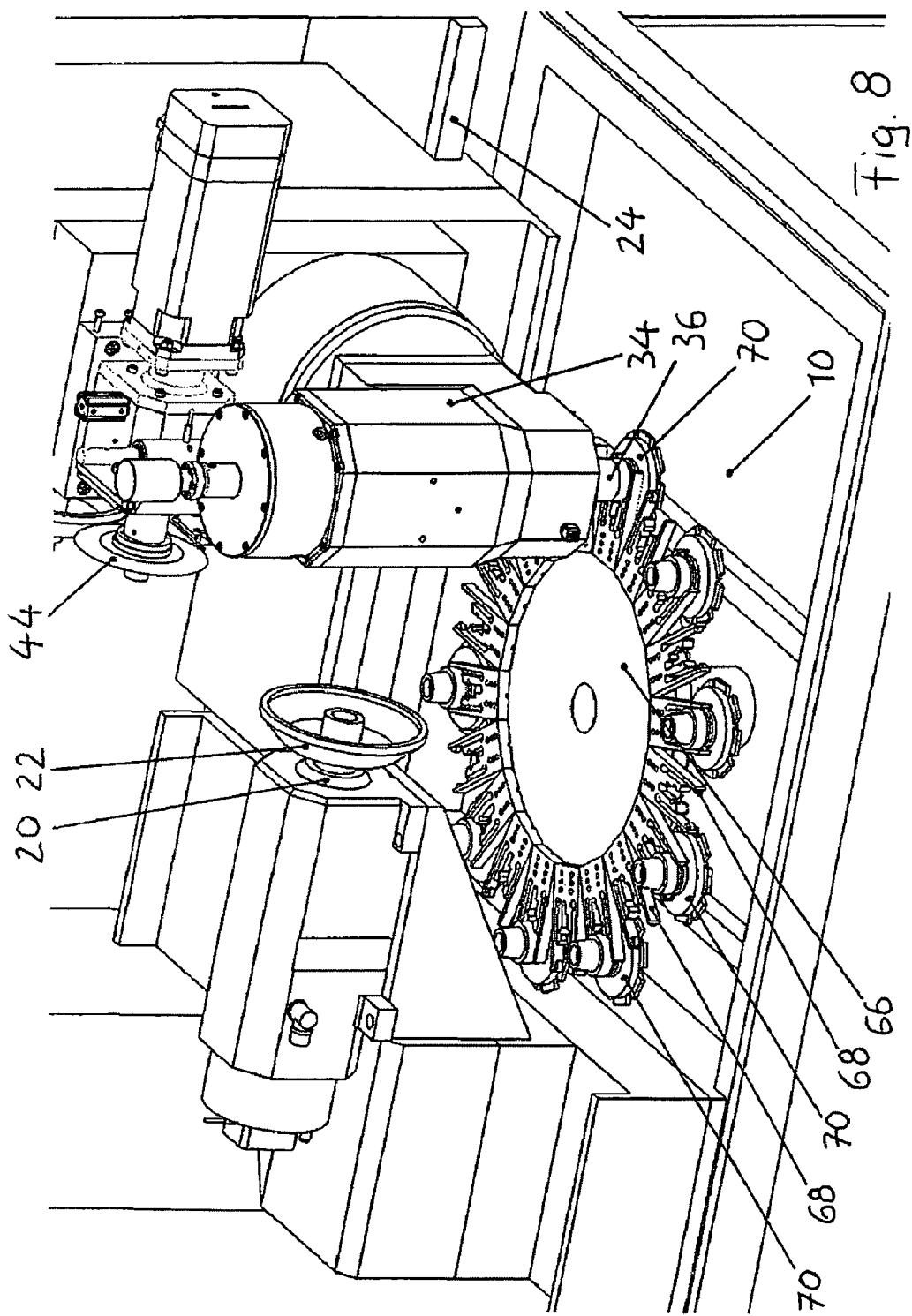

FIG. 8 shows a further embodiment of the work piece magazine. In this case as well, the work piece magazine is configured with a magazine wheel 66 that is capable of rotating around a vertical axis (Z-axis). The magazine wheel 66 has work piece holders 68 on its outer periphery, in which work carriers 70 can be inserted and removed radially. To remove a work carrier 70 from the magazine wheel 66, the work piece jig 36 is placed in the Z-axis on the selected work carrier 70, to clamp the work carrier 70. The work piece jig 36 is then moved in the X-axis by means of the X-carriage 26, in order to remove the work carriers 70 from the work piece holder 68 in a radial direction. In the reverse sequence of movements, a processed work carrier 70 can be placed in an open work piece holder 68 of the work piece magazine.

The automatic work piece change can be performed according to the invention by utilizing the five main axes (X, Y, Z, A, B), without requiring numerically controlled auxiliary axes.

LIST OF REFERENCE SYMBOLS

10 Machine bed
12 Machine column
14 Y-guide
16 Y-carriage
18 Motor
20 Tool spindle
22 Grinding tools
24 X-guide
26 X-carriage
28 Supplementary X-guide
30 Z-guide
32 Z-carriage
34 Dividing attachment
36 Work piece clamping device
38 Drive
40 Dressing spindle
42 Drive motor
44 Dressing tool
46 Tool magazine
48 Shaft
50 Magazine wheel
52 Tool holder
54 Work piece
56 Support plate
58 Guide tracks
60 Cartridge
62 Pin
64 Perforated slat
66 Magazine wheel
68 Work piece holder
70 Work carrier

The invention claimed is:

1. Grinding machine, comprising:
a machine bed,
a Y-carriage that is linearly movable in only a Y-direction parallel to a Y-axis on the machine bed,
a rotationally-driven tool spindle mounted on the Y-carriage and configured to be rotatable around an X-axis perpendicular to the Y-axis while remaining aligned with the X-axis,
an X-carriage that is linearly movable in an X-direction parallel to the X-axis on the machine bed,
a Z-carriage that is linearly movable on the X-carriage along a Z-direction parallel to a Z-axis perpendicular to the X-axis and the Y-axis,
a drive operably connected to the Z-carriage, and
a work piece jig connecting with the Z-carriage and configured to pivot around a B-axis which is parallel to the Y-axis, and configured to rotate around a rotational A-axis which is perpendicular to the rotational B-axis and further comprising a tool magazine for holding tools, the tool magazine coupled with the X-carriage and offset from the Z-carriage in the Y-direction.

2. Grinding machine according to claim 1, wherein:
the tool magazine is rotatably coupled with the X-carriage and holds tools having axes parallel to the X-axis, and,
the Y-carriage is configured to be moved in the Y-direction into a changing position in which the tool spindle is axially flush with an axis of a tool in a tool holder of the tool magazine.

3. Grinding machine according to claim 2, wherein:
the tool magazine has at least one tool holder connected to the tool magazine at the level of the tool spindle in the Z-direction,
the tool spindle is configured to have a tool clamped in the tool spindle and to move into and out of the tool holder in the Y-direction,
the tool holder is configured to allow a tool that is held in the tool holder to be removed from or placed in the tool spindle by moving the tool magazine in the X-direction.

4. Grinding machine according to claim 3, wherein the tool magazine has a plurality of tool holders located in at least one plane parallel to the tool spindle and configured to be placed in the changing position.

5. Grinding machine according to claim 4, further comprising:
- a rotatable shaft parallel to the X-axis, the rotatable shaft connecting a magazine wheel to the tool magazine and the X-carriage, and
- at least one tool holder connected to a periphery of the magazine wheel.

6. Grinding machine according to claim 1, further comprising:
- a work piece magazine configured to be placed on the machine bed, wherein:
- the work piece jig is configured to be oriented in relation to the work piece magazine by rotation around the B-axis, and
- the work piece jig is configured to be moved in relation to the work piece magazine via at least one of the Z-carriage and the X-carriage.

7. Grinding machine according to claim 6, wherein:
- the work piece magazine holds at least one work piece having at least one axis parallel to the Z-axis, and
- the work piece jig is aligned in the Z-direction.

8. Grinding machine according to claim 7, wherein:
- the work piece magazine has a magazine wheel configured for rotation around an axis that is parallel to the Z-axis,
- the work piece magazine holds at least one work piece having an axis that is parallel to the Z-axis, and
- the at least one work piece is configured to be placed in a changing position, in a plane parallel with the work piece jig by rotation of the magazine wheel.

9. Grinding machine according to claim 8, wherein:
- the magazine wheel has on its periphery work piece holders for work pieces or work carriers, and
- the work piece jig (36) is configured to move the work pieces or work carriers into and out of the work piece holders by movement of the X-carriage.

10. Grinding machine according to claim 6, wherein:
- the work piece magazine holds work pieces in a matrix configuration,
- the work piece magazine is moveable in the Y-direction, and
- the tool jig is configured for positioning at a respectively selected magazine position by movement of the work piece jig in the X-direction and by moving the work piece magazine in the Y-direction.

11. Grinding machine according to claim 10, wherein the work piece magazine (56) is coupled with the Y-carriage for movement in the Y-direction.

12. Grinding machine according to claim 10, wherein:
- the work pieces are blanking dies, held at an angle in the work piece magazine, and
- the work piece jig is aligned around its B-axis in a direction perpendicular to the plane of the blanking dies.

13. Grinding machine according to claim 1, further comprising:
- a rotationally-driven centering spindle arranged on the Z-carriage, and spaced from the work piece jig, the centering spindle being configured for rotation around an axis parallel to the X-axis, wherein
- the centering spindle is further configured to be centered relative to a grinding tool clamped in the tool spindle by movement of at least one of the Y-carriage in the Y-direction, the X-carriage in the X-direction, and the Z-carriage in the Z-direction.

14. Grinding machine according to claim 13, wherein the centering spindle is arranged on the Z-carriage above and spaced from the work piece jig in the Z-direction.

15. Grinding machine according to claim 1, wherein the work piece jig, the centering spindle, and the tool magazine are arranged spaced from one another in the Y-direction.

16. Grinding machine according to claim 1, wherein:
- the machine bed is arranged horizontally,
- the Y-carriage and the X-carriage are configured to be moved horizontally on the machine bed, and
- the Z-carriage is configured to be moved vertically from above in relation to the tool spindle.

* * * * *